United States Patent
Kreikemeier et al.

(10) Patent No.: US 12,405,483 B2
(45) Date of Patent: Sep. 2, 2025

(54) PIEZO-BASED BEAM STABILIZATION FOR CRYOGENIC ENVIRONMENTS

(71) Applicant: IonQ, Inc., College Park, MD (US)

(72) Inventors: Sarah Margaret Kreikemeier, San Diego, CA (US); Kai Makoto Hudek, Hyattsville, MD (US)

(73) Assignee: IonQ, Inc., College Park, MD (US)

( * ) Notice: Subject to any disclaimer, the term of this patent is extended or adjusted under 35 U.S.C. 154(b) by 440 days.

(21) Appl. No.: 18/164,331

(22) Filed: Feb. 3, 2023

(65) Prior Publication Data

US 2024/0160031 A1 May 16, 2024

Related U.S. Application Data

(60) Provisional application No. 63/306,689, filed on Feb. 4, 2022.

(51) Int. Cl.
*G02B 27/64* (2006.01)
*G02B 26/08* (2006.01)

(52) U.S. Cl.
CPC ....... *G02B 27/646* (2013.01); *G02B 26/0883* (2013.01)

(58) Field of Classification Search
CPC ... G21K 1/003; G02B 27/626; G03B 26/0883
See application file for complete search history.

(56) References Cited

U.S. PATENT DOCUMENTS

| | | | |
|---|---|---|---|
| 2019/0348251 A1* | 11/2019 | Monroe | H01J 37/08 |
| 2019/0363519 A1* | 11/2019 | Lochman | H01S 5/02326 |
| 2020/0028312 A1* | 1/2020 | Monroe | G02B 7/1827 |
| 2023/0108792 A1* | 4/2023 | Boege | H04N 23/55 |
| 2023/0200016 A1* | 6/2023 | Kreikemeier | F17C 3/085 |
| | | | 62/49.1 |
| 2024/0086754 A1* | 3/2024 | Kreikemeier | G06N 10/40 |

* cited by examiner

*Primary Examiner* — David P Porta
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to various aspects of methods and systems for piezoelectric-based (or piezo-based) beam stabilization for cryogenic environments used in QIP systems.

20 Claims, 9 Drawing Sheets

PIEZO-BASED BEAM STABILIZATION FOR CRYOGENIC ENVIRONMENTS

CROSS-REFERENCE TO RELATED APPLICATION

This application claims the benefit of U.S. Provisional Patent Application No. 63/306,689, filed Feb. 4, 2022, the entire contents of which are hereby incorporated by reference.

TECHNICAL FIELD

Aspects of the present disclosure relate generally to systems and methods for use in the implementation and/or operation of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of methods and systems for piezoelectric-based (or piezo-based) beam stabilization for cryogenic environments, including cryogenic environments used in QIP systems.

In some aspects, a system for piezoelectric-based beam stabilization includes a laser beam source configured to produce a laser beam, a target, a lens assembly, and one or more piezoelectric transducers. The lens assembly includes a lens objective configured to produce an output beam from the laser beam and at least one optical element movably coupled to the lens assembly and configured to direct the laser beam to the target. The one or more piezoelectric transducers are coupled to at least one optical element and configured to dynamically reposition the at least one optical element in response to relative motion between the target and the lens assembly.

In some aspects, a computer implemented method for performing piezoelectric-based beam stabilization for a cryogenic environment includes receiving, by a computing system including a processor and a memory, information indicative of a relative position of a target and a cryogenic lens assembly positioned inside the cryogenic environment; determining, by the computing system, an amount of displacement between the target and the lens assembly; generating, by the computing system, a repositioning command configured to actuate one or more piezoelectric elements coupled to a movable optical element of the lens assembly to reposition the movable optical element to direct an output beam produced by an objective lens of the lens assembly onto the target.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Cryogenic chambers may be used in various applications, including in some QIP systems such as QIP systems based on trapped-ion technologies or other atomic-based technologies. It is advantageous for high performance laser systems that interface with cryogenic chambers to be able to compensate for vibrations that occur within a cryostat. It is further advantageous for such systems to be able to be adjustable and/or repositionable by sufficient degrees of freedom to maintain alignment between optical components and/or targets inside the cryostat as the cryostat is cooled down to operating temperatures. For example, assemblies within the cryostat will undergo thermal contraction and will be exposed to vibrations produced by the pumping of gaseous or liquid helium necessary for maintaining the cryogenic environment. In many applications, optical components that are installed within a cryostat require precise alignment and stability relative to other internal and/or external components.

Solutions to the issues described above are explained in more detail in connection with FIGS. 1-7, with FIGS. 1-3 providing a background of QIP systems or quantum computers, and more specifically, of atomic-based QIP systems or quantum computers such as trapped-ion QIP systems for example. Aspects of these solutions involve, for example, stabilizing the output beam of a cryogenic lens objective to a target using piezoelectric actuators and non-contact sensors for feedback. Typical applications often take an alternate approach of adjusting the position of the target or the position of the lens to maintain interferometric stability and alignment.

Figure 1:
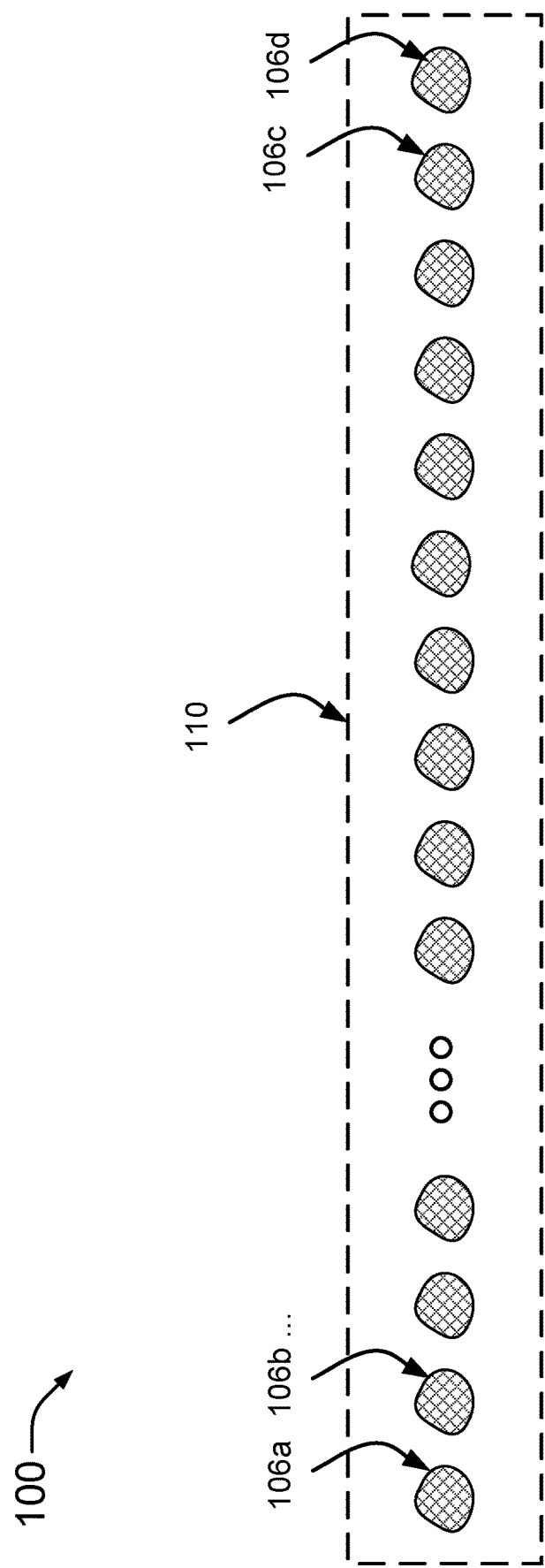
FIG. 1 illustrates a view of atomic ions a linear crystal or chain in accordance with aspects of this disclosure.
Figure 2:
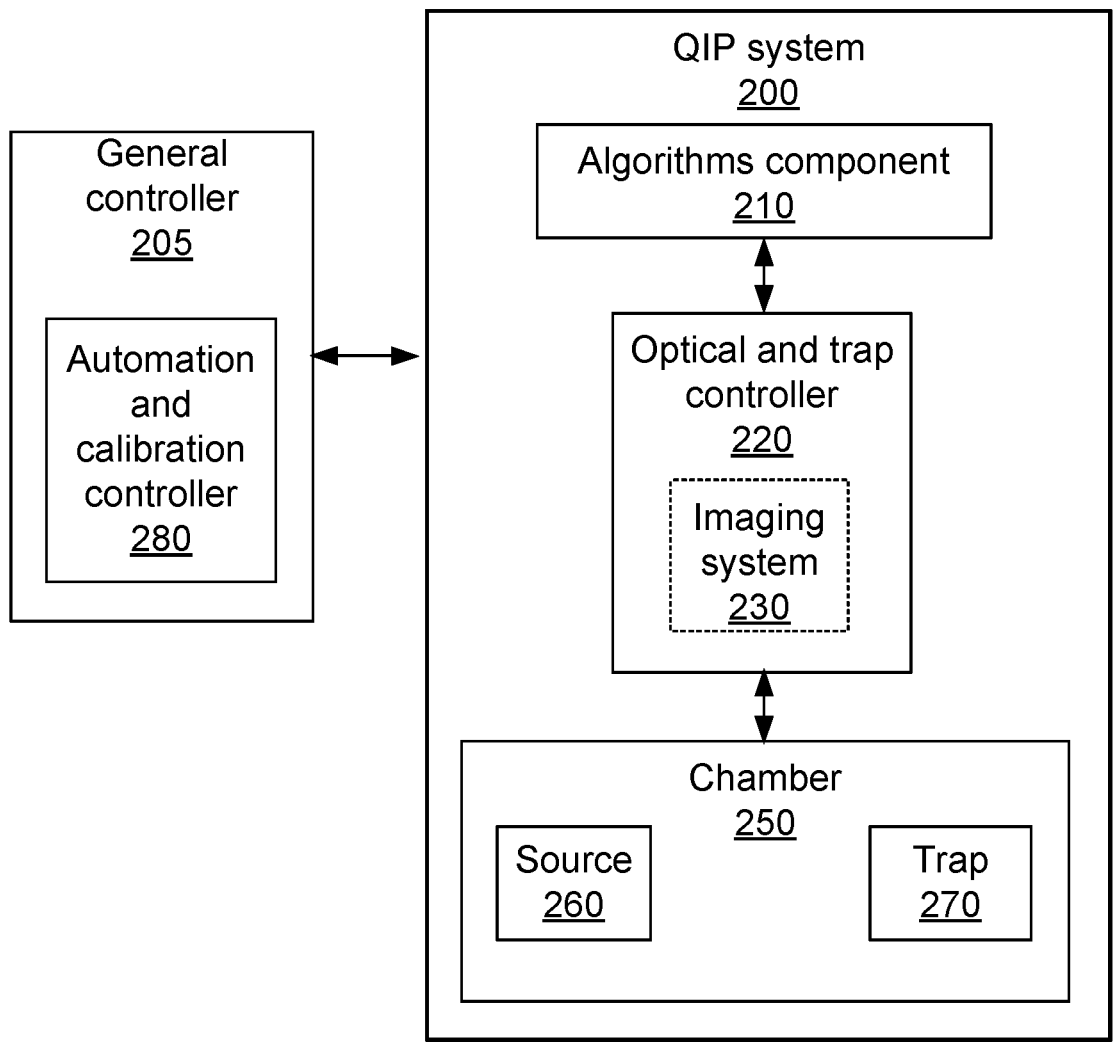
FIG. 2 illustrates an example of a quantum information processing (QIP) system in accordance with aspects of this disclosure.

FIG. 1 illustrates a diagram 100 with multiple atomic ions 106 (e.g., atomic ions 106a, 106b, . . . , 106c, and 106d) trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}Yb^+$ ions), for example. The atomic ions are illuminated with laser (optical) radiation tuned to a resonance in $^{171}Yb^+$ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

In some instances, to improve operational performance, the chain 110 may be placed inside a cryogenic environment such as the ones described herein.

FIG. 2 shows a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

Shown in FIG. 2 is a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270, and controls the operation of lasers and optical systems that provide optical beams that interact with the atoms or ions in the trap. When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

For example, at least parts of the chamber 250 may operate under cryogenic conditions. In one example, the chamber 250 may be a cryostat or comprise a cryostat to provide specific cryogenic conditions. The chamber 250 may support one or more stages. In one example, the chamber 250 may support a stage at 4 Kelvin. In another example, the chamber 250 may support a first stage or first environment at 40 Kelvin, and a second stage or second environment within the first stage at 4 Kelvin.

Aspects of this disclosure may be implemented at least partially using the chamber 250 and/or components therein.

Figure 3:
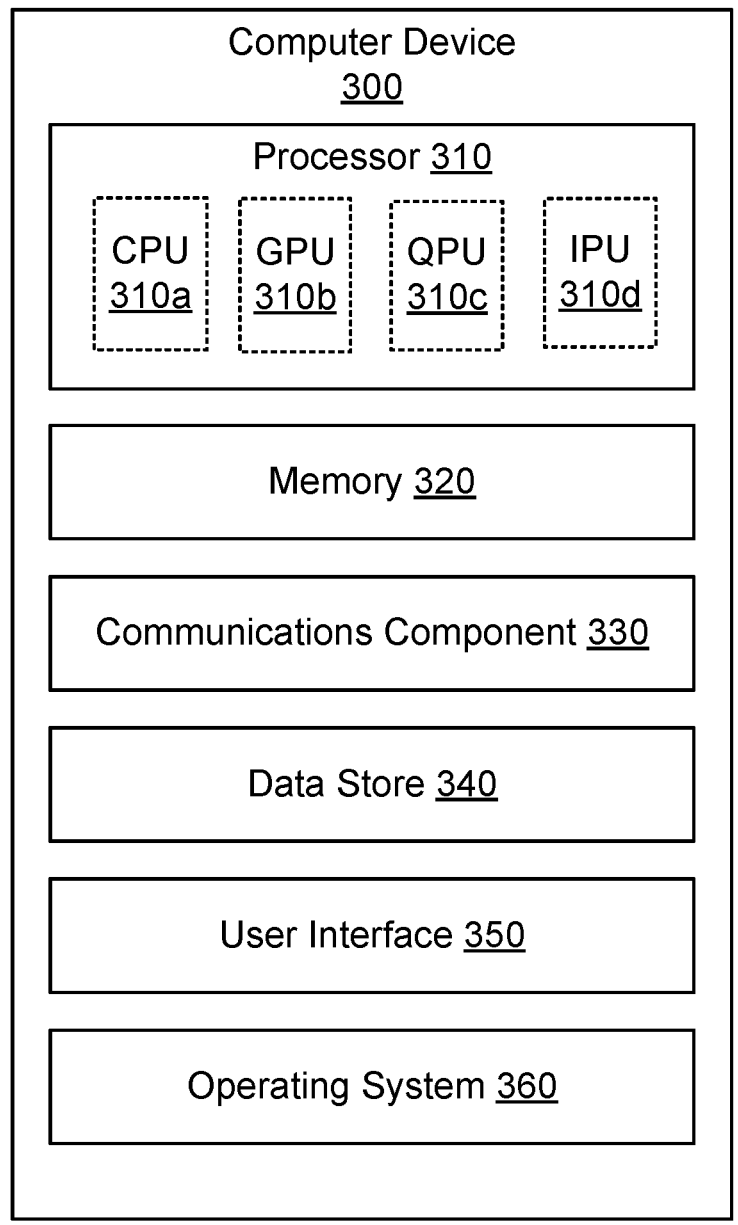
FIG. 3 illustrates an example of a computer device in accordance with aspects of this disclosure.

Referring now to FIG. 3, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, this disclosure describes examples of beam stabilization in cryogenic environments including those used for QIP systems. In an example aspect, this disclosure describes mechanisms and configurations to maintain interferometric alignment between the output of a cryogenic lens and a target without adjusting the position of the cryogenic lens or the target. As used herein, the phrase "interferometric alignment" means that two components (e.g., the lens and the target) are aligned to within an optical wavelength of a laser beam used in an interferometer sensor. In some aspects, the aligned components are aligned to within less than a micron. In some aspects, the aligned components are aligned to within 10 nm. In some aspects, the aligned components are aligned to within 1 nm. As used herein, the phrase "cryogenic lens" refers to a lens that is positioned in the cryostat chamber 250. Due to the mass of the cryogenic lens and the need to maintain dynamic stability of the cryogenic lens, the cryogenic lens is rigidly mounted to a mechanical structure within the cryostat. The target is also rigidly mounted to a separate mechanical structure within the cryostat. In some aspects, a number of complex interfaces may be used to maintain the target in a fixed position relative to the cryostat. While both the target and the cryogenic lens assembly are fixed within the cryostat, their positions relative to one another are not. For example, differences in thermal contraction and unique vibration responses of the target and lens contribute to interferometric instability and misalignment during operation of the cryostat. Thus, the mechanisms described herein enable components within a cryogenic environment (e.g., within a cryogenic chamber or cryostat) to be precisely aligned and stable relative to other internal or external components.

Figure 4:
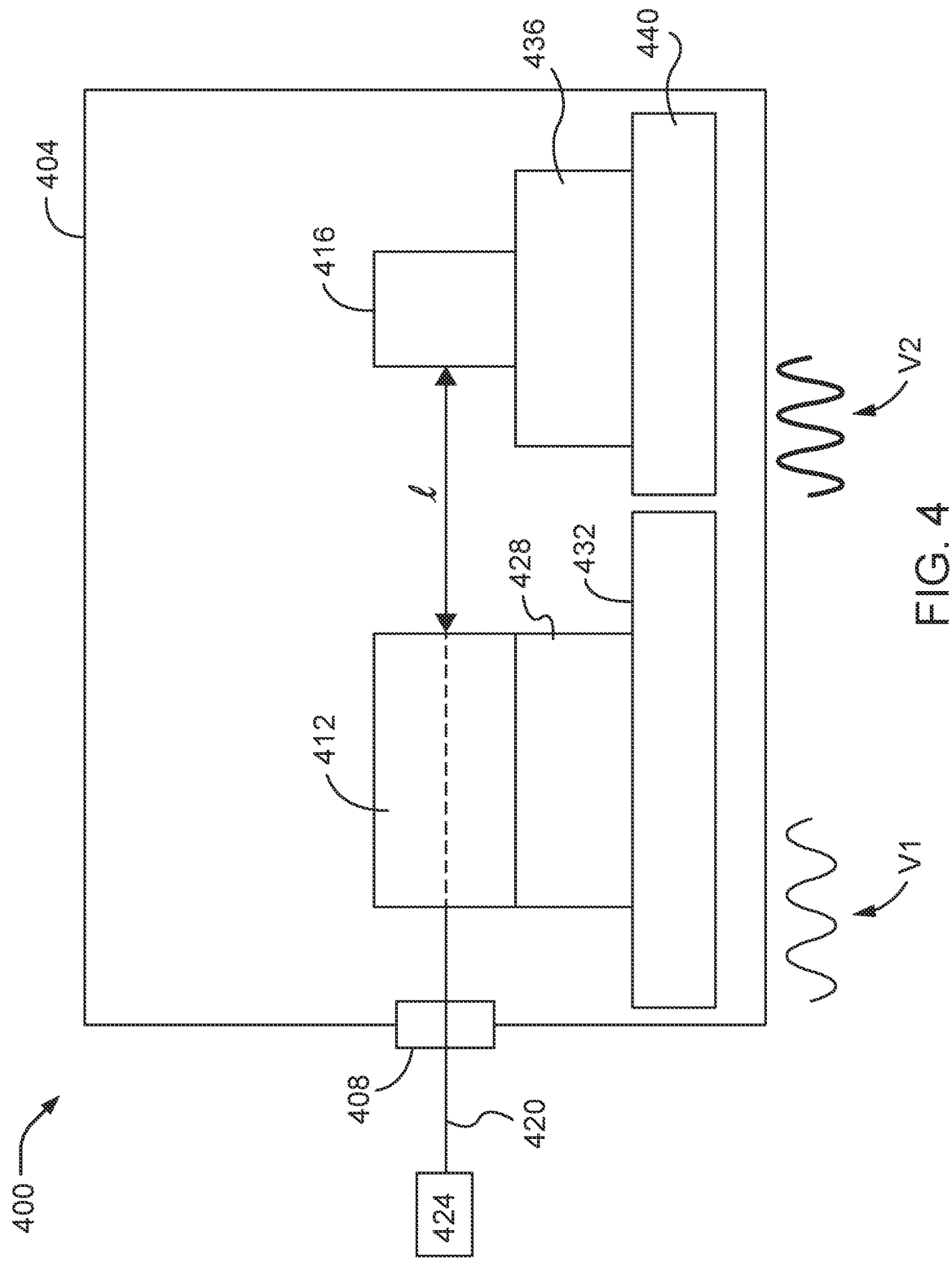
FIG. 4 illustrates a cryogenic lens assembly and a target positioned within a cryostat in accordance with aspects of this disclosure.

FIG. 4 illustrates a cross-sectional view of a cryostat 400 that includes a housing 404 that defines the cryostat chamber 250, as described above with respect to FIG. 2, according to an example aspect. Moreover, the housing 404 also provides a vacuum that insulates the cryostat chamber 250 from the ambient temperature conditions surrounding the cryostat 400. The cryostat housing 404 may include one or more viewports 408 that are configured to allow optical access to the cryostat chamber 250.

A helium flow line is configured to provide a flow of cooled helium to a cryogenic base plate to maintain the cryostat chamber 250 at cryostatic temperatures. In operation, the pumping of liquid or gaseous helium necessary for creating cryogenic conditions may introduce vibration into the cryogenic chambers 250. In an example aspect, a first stage or intermediate cooling stage and a second stage or cryostatic stage are coupled to the cryogenic base plate. Moreover, a temperature of the first stage can be maintained at approximately 40 K and a temperature of the second stage can be maintained at approximately 4 K.

In the illustrated aspect, a cryogenic lens assembly 412 and a target 416 are positioned within the cryostat chamber 250 and may be mounted to the cryostat stages to maintain the cryogenic lens assembly 412 and the target 416 at the temperature of the particular cryostat stage. In some aspects, the cryogenic lens assembly 412 and the target 416 may be coupled to different stages. For example, the cryogenic lens assembly 412 may be coupled to the first stage and the target 416 may be coupled to the second stage. In another aspect, the cryogenic lens assembly 412 and the target 416 may be coupled to the same stage.

In this aspect, the cryogenic lens assembly 412 is configured to direct a laser beam 420 onto a particular portion of the target 416. In the illustrated aspect, the laser beam 420 is produced by a source 424 positioned outside of the cryostat 400. The source 424 is oriented such that the laser beam 420 can enter the chamber 250 through the viewport 408. In some aspects, adjustment knobs positioned upstream of the cryogenic lens assembly 412 may be provided to tune (e.g., by an operator) the assembly 412 to ensure the beam 420 is aligned to an optical axis of a lens of the cryogenic lens assembly 412 before the beam 420 enters the cryostat chamber 250. For example, the incoming beam 420 is aligned in pitch and yaw to the optical axis A (FIG. 5) of the cryogenic lens assembly 412.

The cryogenic lens assembly 412 may be mounted to a cryogenic lens assembly mounting structure 428. The cryogenic lens assembly mounting structure 428 may be mounted to a cryogenic lens platform 432, which in turn may be or include a portion of first or second stage of the cryostat 400.

The target 416 may include the ion trap 270. The target 416 may be mounted to a target mounting structure 436. In aspects in which the target 416 includes the ion trap 270, the target mounting structure 436 may be a cold finger assembly to which the ion trap 270 is mounted. In other aspects, the target 416 may be or include detectors and/or optical components. In yet other aspects, the target 416 may be or include a particular qubit. The target mounting structure 436 may be mounted to a cryogenic target platform 440, which in turn may be or include a portion of the first or second stage of the cryostat 400. A distance between the cryogenic lens assembly 412 and the target 416 is indicated by the arrow l. As described in detail below, it is advantageous to maintain the distance l between the cryogenic lens assembly 412 and the target 416 to be substantially constant during operation of the cryostat 400. In configurations in which the cryogenic lens assembly 412 and the target 416 are coupled to different stages of the cryostat 400, the distance l between the cryogenic lens assembly 412 and the target 416 may be maintained substantially constant during operation of the cryostat 400 to compensate for relative vibrations between the different stages, as described in greater detail below.

During operation of the cryostat 400, the cryogenic lens platform 432 and the cryogenic target platform 440 typically each experience their own vibration spectrum in response to vibrations of the cryostat 400. For example, schematic representations of the vibration spectrum of the cryogenic lens platform 432 is shown as V1 and the vibration spectrum of the cryogenic target platform 440 is shown as V2 in FIG. 4. The different vibration spectra of the cryogenic lens platform 432 and the cryogenic target platform 440 may cause relative motion between the cryogenic lens assembly 412 and the target 416. As a result, this relative motion may cause misalignment between the cryogenic lens assembly 412 and the target 416. In configurations in which the cryogenic lens platform 432 and the cryogenic target platform 440 are coupled or include a portion of the different stages of the cryostat 400, the different vibration spectra may occur at least in part due to relative vibrations of the different stages.

During operation of the cryostat 400, the distance l between the cryogenic lens assembly 412 and the target 416 is maintained constant, as described with respect to the configurations below in more details, to provide interferometric stability between the cryogenic lens assembly 412 and the target 416. The distance l between the cryogenic lens assembly 412 and the target 416 is maintained substantially constant during operation of the cryostat 400 such that a location at which the beam 420 hits the target 416 is maintained at a constant position to provide optical alignment between the cryogenic lens assembly 412 and the target 416. In order to maintain interferometric stability between the portion of the beam 420 output from (e.g., exiting) the cryogenic lens assembly 412 and the focal point on the target 416, piezoelectric actuators can be used to actuate intermediate optics, such as a dove prism (in the cryogenic lens assembly), to maintain alignment with the target 416, as shown below in FIG. 5.

Figure 5:
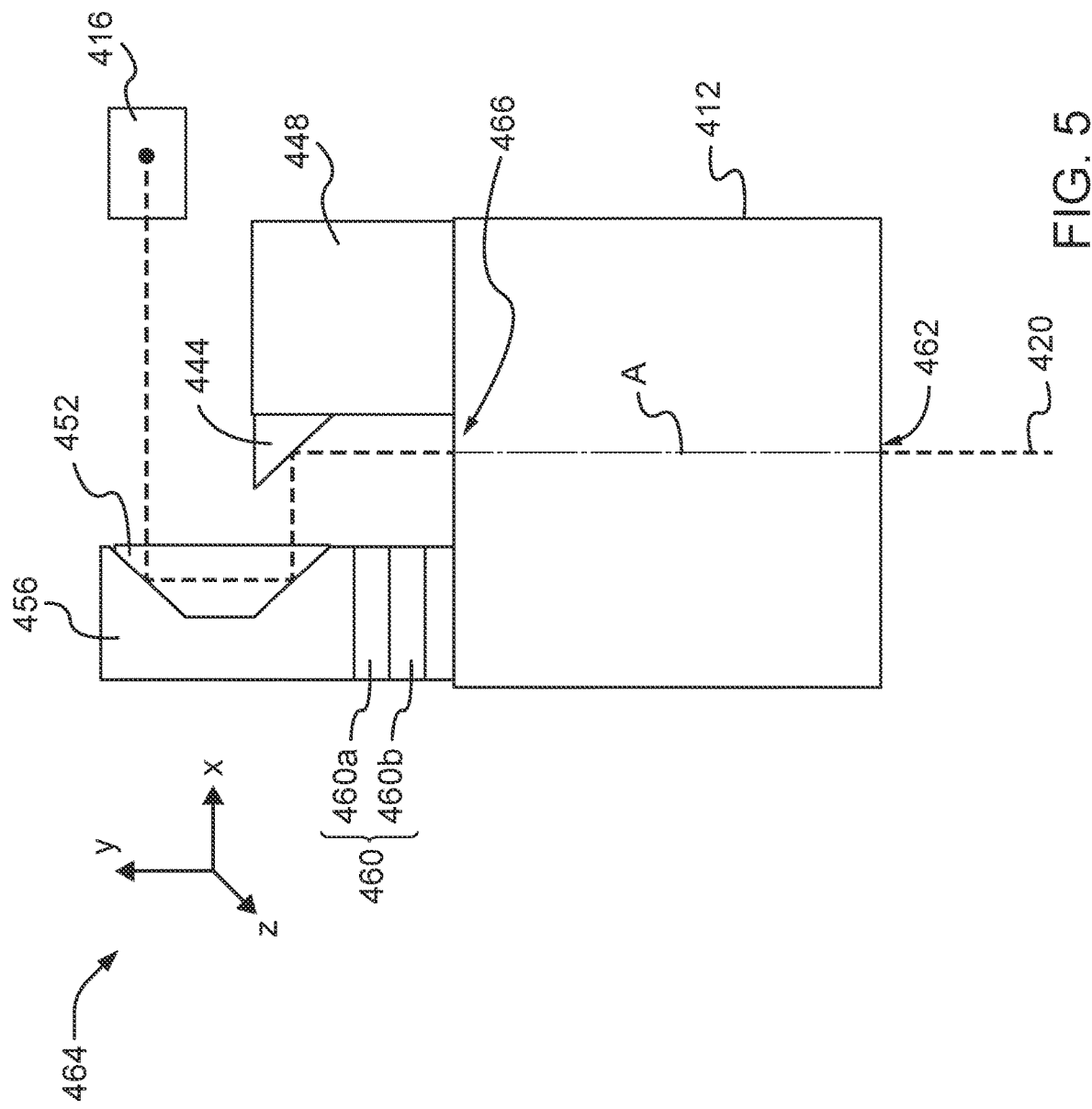
FIG. 5 illustrates an example configuration in which piezoelectric actuators are configured to actuate a dove prism movably coupled to the cryogenic lens assembly to maintain alignment with the target in accordance with aspects of this disclosure.

FIG. 5 shows a top view of the cryogenic lens assembly 412 and the target 416. As shown in FIG. 5, a right-angle prism or mirror 444 may be directly or indirectly (e.g., via support 448) fixedly coupled to the cryogenic lens assembly 412. The right-angle prism 444 is fixed relative to an optical axis A of the cryogenic lens assembly 412.

A dove prism or pair of angled mirrors 452 is movably coupled to the cryogenic lens assembly 412, for example, by a support 456. An example of a dove prism that can be implemented as dove prism 452 is described in U.S. patent application Ser. No. 16/903,174, titled "Optical Alignment Using Reflective Dove Prisms," which is incorporated herein by reference in its entirety. The right-angle prism 444 and dove prism 452 are attached to mounting structures on the cryogenic lens assembly 412 to maintain angular alignment of the beam 420 to a location on the target 416. The dove prism 452 may be movably coupled to the cryogenic lens assembly 412 by one or more piezoelectric transducers 460 that are configured to provide translation of the dove prism 452 in one or more directions to maintain the distance l. For example, the configuration illustrated in FIG. 5 includes a first piezoelectric transducer 460a configured to move the dove prism 452 in a first direction and a second piezoelectric transducer 460b configured to move the dove prism 452 in a second direction. In the present example, the piezoelectric transducers 460a, 460b may be configured to provide translation of the dove prism 452 in an X-Y plane shown by the coordinate system 464 of FIG. 5. The piezoelectric transducers 460a, 460b include a piezoelectric material. As used herein, the term "piezoelectric material" refers to a layer or material, such as a crystal or ceramic, that undergoes the converse piezoelectric effect, in which the material undergoes a displacement in response to an electric field generated by an applied electrical voltage. Piezoelectric transducers 460a, 460b are configured to provide sub-micron displacements at high speed based on a voltage signal. Additionally, the piezoelectric transducers 460a, 460b can operate in cryogenic environments and have compact footprints. To achieve a larger operating range of the piezoelectric transducers 460a, 460b in any one direction, the piezoelectric transducers 460a, 460b can be stacked in series.

As shown in FIG. 5, the beam 420 enters the cryogenic lens assembly 412 at a beam input 462 and travels through the cryogenic lens assembly 412 along the axis A of the cryogenic lens assembly 412, exiting the cryogenic lens assembly at a beam output 466. The beam 420 (e.g., the output beam) is then deflected by the prism 444 towards the dove prism 452. In the example configuration, the beam 420 is deflected by the dove prism 452 such the beam 420 is aligned with the target 416 when the beam 420 exits the dove prism 452.

The piezoelectric transducers 460 are configured to be actuated to position or reposition the dove prism 452 to position or reposition the beam 420 relative to the target 416. In particular, actuation of the piezoelectric transducers 460 compensates for relative motion between the cryogenic lens assembly 412 and the target 416. For example, in the configuration of FIG. 5, the piezoelectric transducers 460a, 460b can be repositioned along the X-axis direction and Y-axis direction of the coordinate system 464. The piezoelectric transducers 460 can compensate for fast and/or slow motion between the beam output 466 and the target 416. An example of fast motion includes the vibrations that occur during operation of the cryostat 400. An example of slow motion includes drift. In some aspects, a second dove prism substantially similar to the dove prism 452 may be movably coupled to the cryogenic lens assembly 412 and positioned between the beam output 466 and target 416. In such aspects, an orientation of the second prism is substantially rotated 90 degrees about the axis A relative to the dove prism 452. In such a configuration, the second dove prism is configured to reposition the beam 420 in a direction substantially orthogonal to the repositioning provided by the dove prism 452.

In some aspects, one or more sensors may be configured to determine the displacement between the beam output 466 and the target 416. In some aspects, the one or more sensors may be non-contact sensors, such as, for example interferometer sensors or capacitive displacement sensors. In some aspects, other types of non-contact sensors may be used. Interferometer sensors can provide high resolution and accuracy for measuring the displacement between the cryogenic lens assembly 412 and the target 416. Such sensors can have absolute position measurement abilities and long working distances. In configurations in which the sensor(s) are interferometric sensors, the sensor target is a reflective sensor target. In configurations in which the sensor(s) are conductive sensors, the sensor target is a conductive sensor target.

There are various configurations that can be used to mount the non-contact sensors. In a first configuration, non-contact sensors can be mounted to the fixed portion of the cryogenic lens assembly 412 and aligned to a reflective or conductive sensor target (e.g., feedback reference point) near the target 416 to directly and dynamically measure x, y, and/or z displacements between the target 416 and the beam output 466. In this configuration, one sensor per coordinate direction is used.

In a second configuration, two non-contact sensors per coordinate direction are used. Both of the non-contact sensors share the same fixed reference point, such as the sensor target. In this aspect, for each coordinate direction, a first sensor is configured to determine the displacement of the cryogenic lens assembly 412 and a second sensor is configured to determine the displacement of the target 416. Since the first and second sensors share the same fixed reference point, the relative displacement between the target 416 and cryogenic lens assembly 412 can be calculated, for example by the general controller 205 and/or the optical and trap controller 220.

Figure 6:
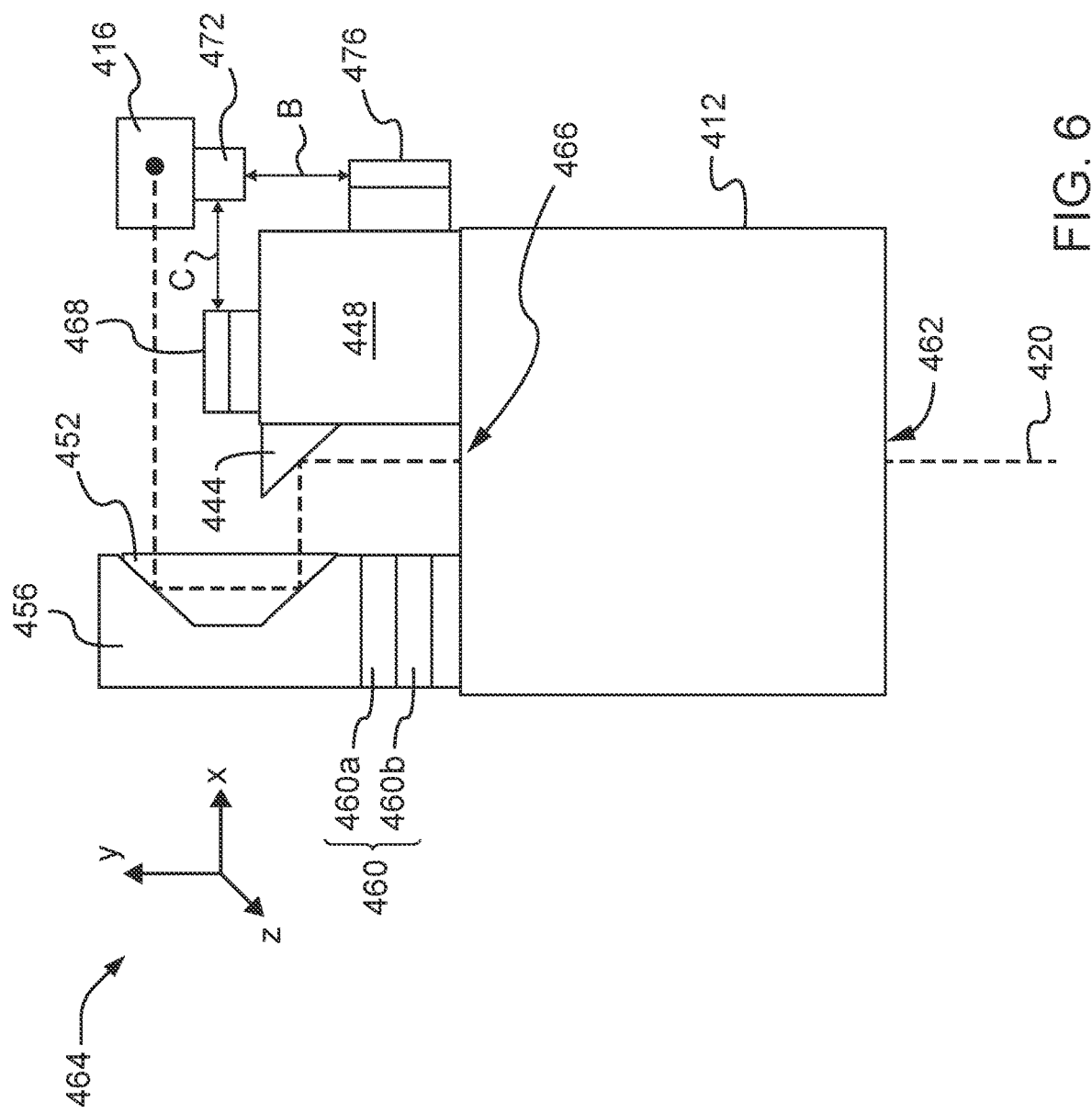
FIG. 6 illustrates an example of piezoelectric adjustments to the dove prism to correct misalignments and dynamically stabilize an output beam to a target in accordance with aspects of this disclosure.

FIG. 6 illustrates an example of the first configuration that is configured for determining displacements along the X-axis direction and/or Y-axis direction of the coordinate system 464. In the configuration illustrated in FIG. 6, a first non-contact sensor 468 is coupled to the support 448 of the cryogenic lens assembly 412 and aligned with a sensor target 472 along the X-axis direction of the coordinate system 464. The sensor target 472 is coupled to the target 416. Interactions between the first non-contact sensor 468 and the sensor target 472 are shown schematically by the arrow B. In other aspects, the first non-contact sensor 468 may be mounted to other fixed portions of the cryogenic lens assembly 412. A second non-contact sensor 476 is coupled to the support 448 and aligned with the sensor target 472 along the Y-axis direction of the coordinate system 464. Interactions between the second non-contact sensor 476 and the sensor target 472 are shown schematically by the arrow C. In other aspects, the second non-contact sensor 468 may be mounted to other fixed portions of the cryogenic lens assembly 412. Since both the non-contact sensors 468, 476 are coupled to the cryogenic lens assembly 412 and the sensor target 472 is coupled to the target 416, relative motion between the cryogenic lens assembly 412 and the target 416 can be determined. In the illustrated configuration, the non-contact sensors 468, 476 are interferometer sensors and the sensor target 472 is a reflective sensor target. In other aspects, the non-contact sensors 468, 476 may be capacitive displacement sensors and the sensor target 472 may be a capacitive sensor target. In such aspects, the non-contact sensors 468, 476 may be positioned closer to the sensor target 472. For example, the capacitive sensors may be positioned within microns of the capacitive sensor target. In such aspects, the working distances of the capacitive sensors and the capacitive sensor target, and working distances of the devices, need to be selected with the estimated vibration amplitude in mind.

Although the configuration of FIG. 6 shows the non-contact sensors 468, 476 coupled to the cryogenic lens assembly 412 and the sensor target 472 coupled to the target 416, in other configurations, the non-contact sensors 468, 675 can be coupled to the target 416 and the sensor target 472 can be coupled to the cryogenic lens assembly 412.

Figure 7:
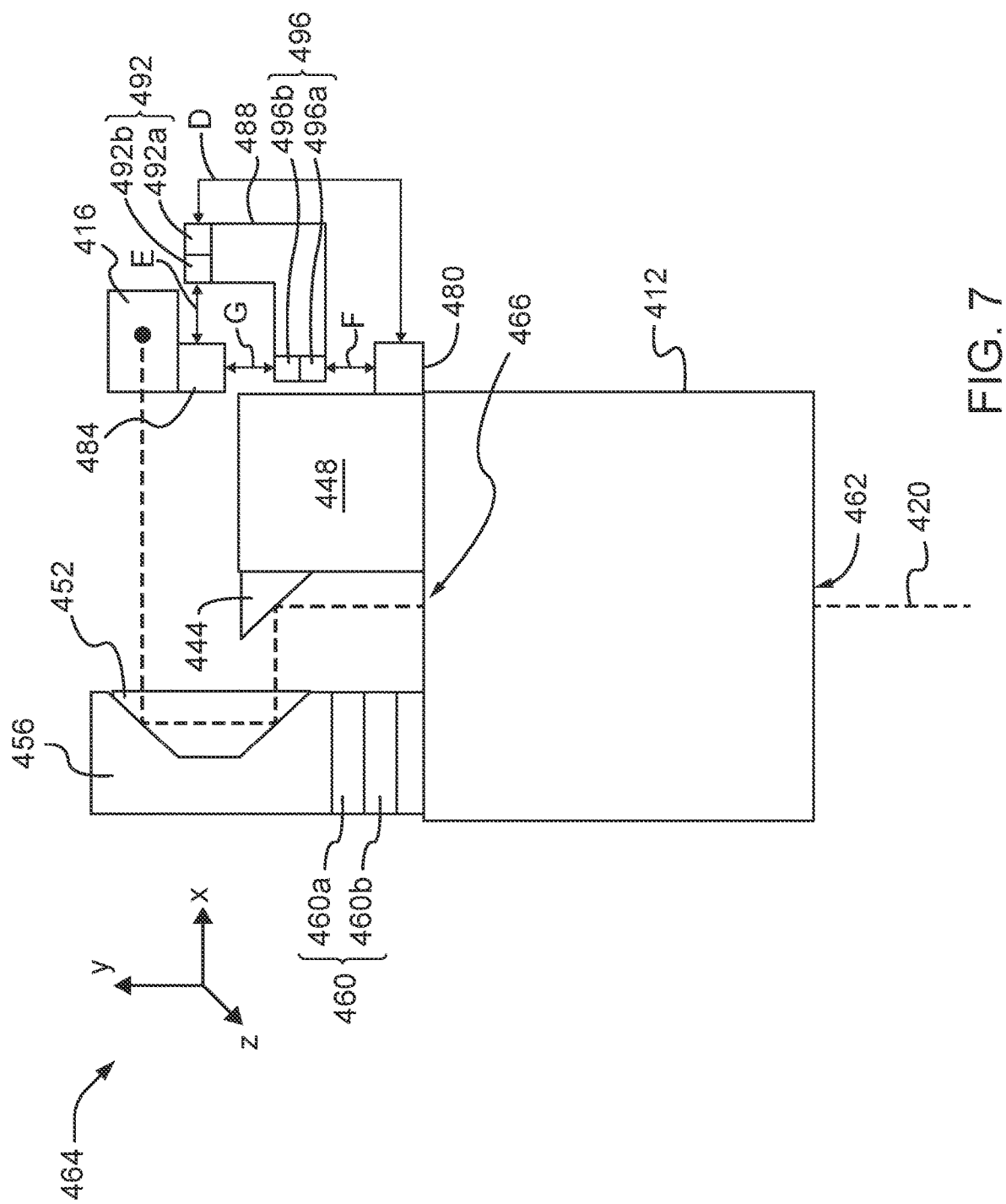
FIG. 7 illustrates another example of piezoelectric adjustments to the dove prism to correct misalignments and dynamically stabilize an output beam to a target in accordance with aspects of this disclosure.

FIG. 7 shows an example of the second configuration that is configured for determining displacements along the X-axis direction and/or Y-axis direction of the coordinate system 464. The configuration shown in FIG. 7 is only described in detail herein to the extent that it differs from the configuration illustrated in FIG. 6.

As shown in FIG. 7, a first sensor target 480 is coupled to the cryogenic lens assembly 412. A second sensor target 484 is coupled to the target 416. A common fixed reference point, shown schematically as block 488, is positioned proximate the cryogenic lens assembly 412 and the target assembly 412. A first non-contact sensor pair 492 is coupled to a portion of the fixed reference point 488 oriented such that the non-contact sensor pair 492 interacts with the first and second sensor targets 480, 484 along the X-axis direction of the coordinate system 464. For example, a non-contact sensor 492a is configured to interact with the first sensor target 480 along the X-axis direction of the coordinate system 464, as shown schematically by the arrow D. A non-contact sensor 492b is configured to interact with the second sensor target 484 along the X-axis direction of the coordinate system 464, as shown schematically by the arrow E. A second non-contact sensor pair 496 is coupled to a portion of the fixed reference point 488 oriented such that the non-contact sensor pair 496 interacts with the first and second sensor targets 480, 484 along the Y-axis direction of the coordinate system 464. For example, a non-contact sensor 496a is configured to interact with the first sensor target 480 along the y-axis direction of the coordinate system 464, as shown schematically by the arrow F. A non-contact sensor 496b is configured to interact with the second sensor target 484 along the Y-axis direction of the coordinate system 464, as shown schematically by the arrow G.

Although the configuration of FIG. 6 shows the non-contact sensor pairs 492, 496 coupled to the fixed reference point 488 and the first and second sensor targets 480, 484 coupled to the cryogenic lens assembly 412 and the target 416, respectively, in other configurations, the non-contact sensor pairs 492, 496 can be coupled to the cryogenic lens assembly 412 and the target 416 and the sensor targets 480, 484 can be coupled to the fixed reference point 488.

As described in greater detail below, active control techniques can be used to identify relative displacements between the cryogenic lens assembly 412 and the target 416 that occur based on information determined by the sensors 468, 476. A controller of the QIP system 200, such as the general controller 205 and/or the optical and trap controller 220 is configured to control the piezoelectric transducers 460a, 460b to reposition the dove prism 452 to compensate for the relative displacement between cryogenic lens assembly 412 and the target 416.

Figure 8:
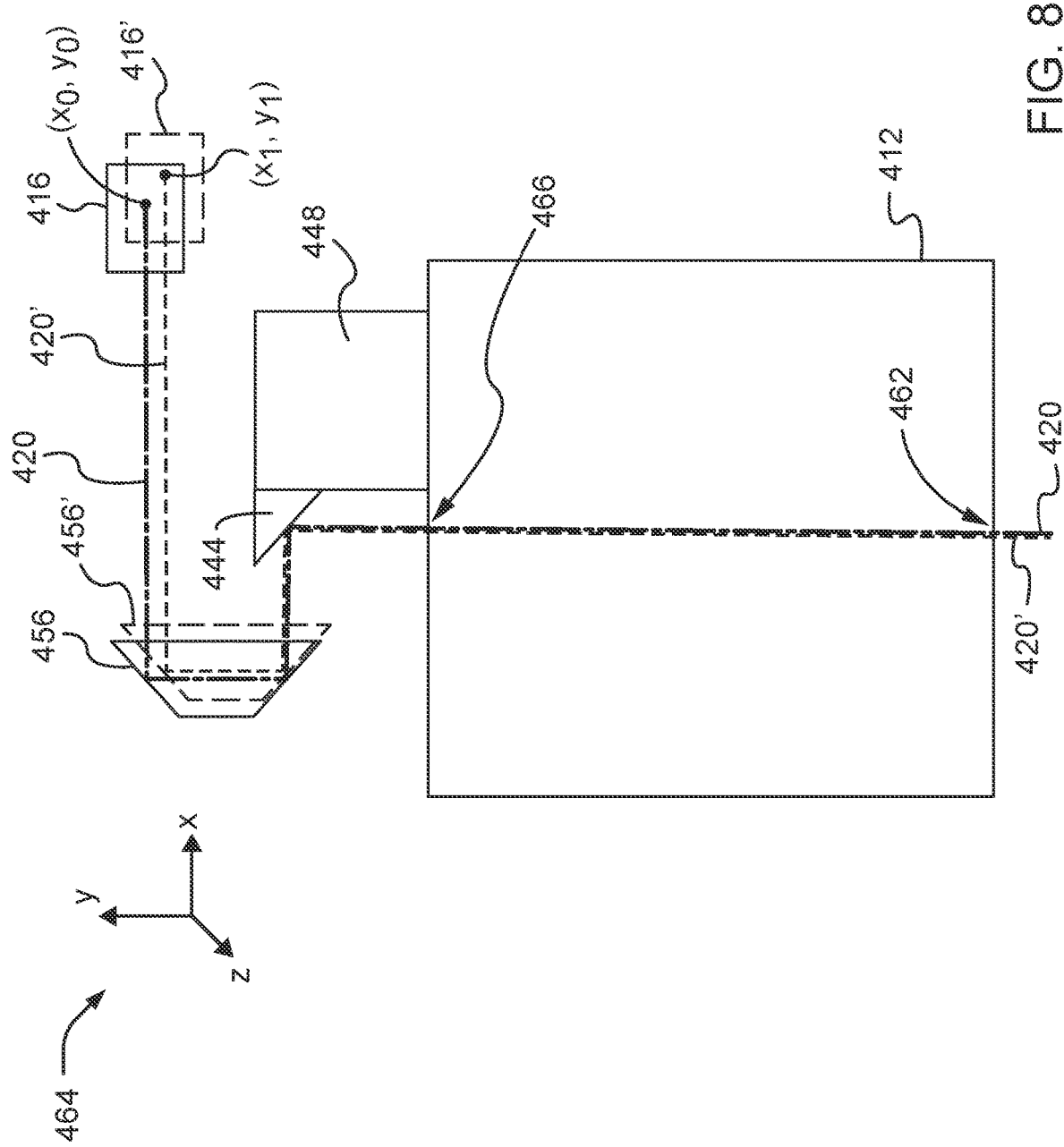
FIG. 8 illustrates an example of beam stabilization by showing the lens assembly as a fixed reference point and the target as shifting in accordance with aspects of this disclosure.

FIG. 8 illustrates an example of beam stabilization in which the cryogenic lens assembly 412 is a fixed reference point and the target 416 shifts (e.g., is displaced) relative to the cryogenic lens assembly 412. Such an example includes configurations in which the non-contact sensors are coupled to fixed portions of the cryogenic lens assembly 412, such that the position of the target 416 is determined relative to the position of the cryogenic lens assembly 412. In the example shown in FIG. 7, shifted positions of components are indicated using the prime sign "'".

The target 416 is shown in a nominal position relative to the beam output 466, with the beam 420 following the path shown using dash-dot lines, with a center of the target 416 shown at a position $(x_0, y_0)$ at a time to. During operation of the cryostat 400, the target 416 shifts relative to the beam output 466 by $x_1$ and $y_1$, such that a center of the displaced target 416' is positioned at point $(x_1, y_1)$ at a time ti. As described in more detail below, the controller 205, 220 may determine the displacement of the target 416' based on position data determined by the non-contact sensors 468, 476. The controller 205, 220 then commands the piezoelectric transducers 460a, 460b shift the dove prism 452 to account for the misalignment.

Figure 9:
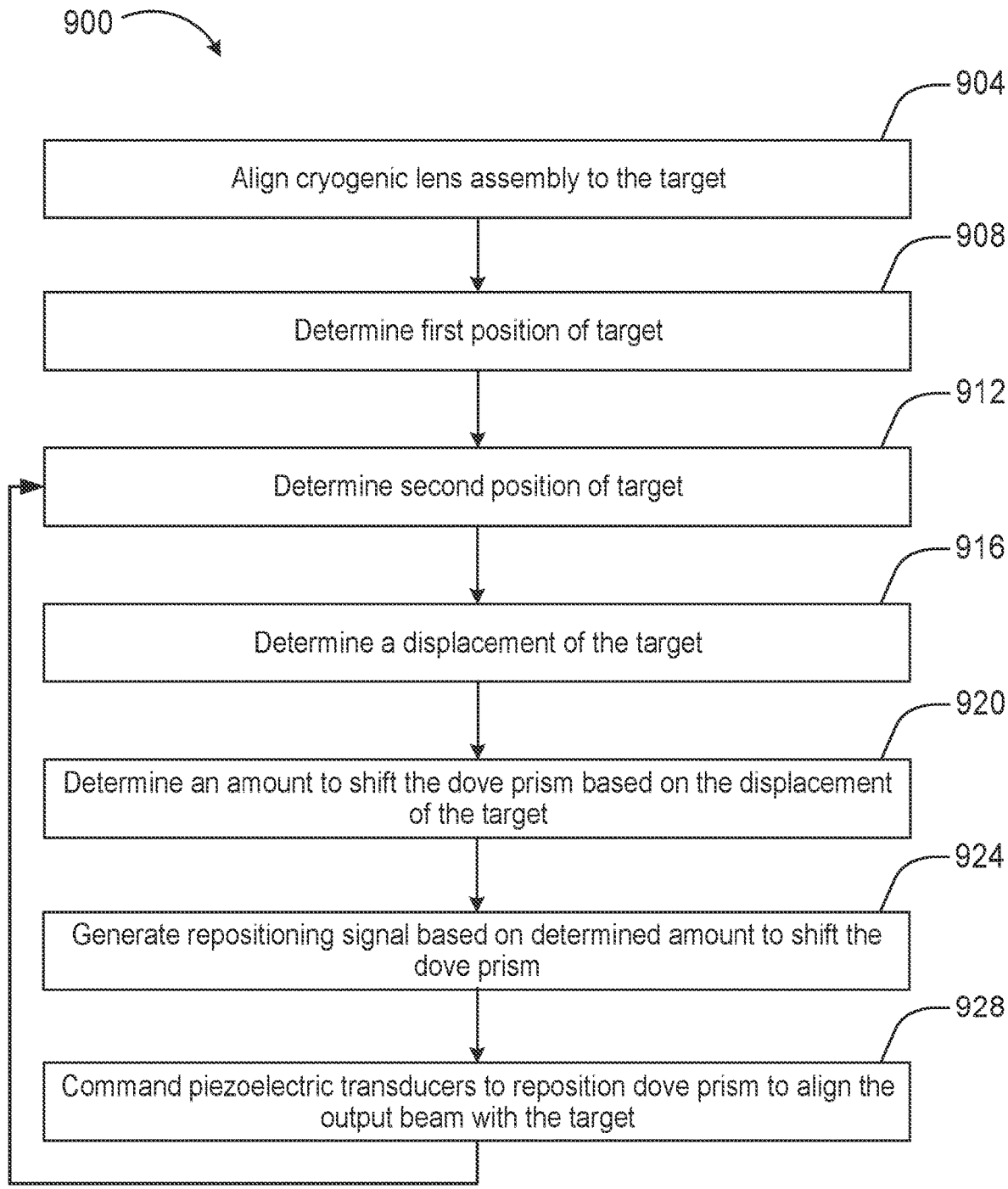
FIG. 9 illustrates an example method of correcting misalignments and dynamically stabilizing an output beam to a target in accordance with aspects of this disclosure.

FIG. 9 illustrates a flowchart of an example method 900 for dynamically repositioning a beam 420 exiting the beam output 466 of the cryogenic lens assembly 412 to compensate for relative displacements (e.g., to correct misalignments due to vibrations, drift, and so forth) between components in a QIP system 200, such as the cryogenic lens assembly 412 and the target 416. The method 900 is enacted by a controller of the QIP system 200, such as, for example, the general controller 205 and/or the optical and trap controller 220 and effectively configures the system as a feedback loop configured to detect relative displacements and control the piezoelectric transducers 460a, 460b to reposition the dove prism 452 to maintain the path length of the beam 420 between the beam output 466 and target 416. In some aspects, the method 900 is configured to dynamically reposition the beam 420 in real-time or substantially real time.

Initially, at 904, the cryogenic lens assembly 412 is aligned with the target 416 such that the output beam is aligned with the target 416.

At 908, the controller 205, 220 determines the initial position of the target 416 based on position information determined by the non-contact sensors 468, 476. In some aspects, the first position of the target 416 is determined based on a reference point, such as a portion the cryogenic lens assembly 412.

At 912, the controller 205, 220 determines a second position of the target 416 based on position information determined by the non-contact sensors 468, 476. In some aspects, the controller 205, 220 may be configured to determine the second position of the target 416 after a predefined amount of time has elapsed since the first position of the target 416 was determined. In some aspects, the controller 205, 220 may monitor the position of the target 416 continuously, and the term "second position" refers to any position of the target 416 that is determined after a previous position of the target 416 has been determined.

At 916, the controller 205, 220 determines a displacement of the target 416 between the first position and the second position.

At 920, the controller 205, 220 determines an amount to shift the dove prism 452 to maintain alignment between the beam 420 exiting the beam output 466 and the target 416 to realign the beam 420 with the target 416. For example, the controller 205, 220 may determine a the amount to shift the dove prism 452 based on the displacement of the target 416 determined at 816 to align the beam 420 with the target.

At 924, the controller 205, 220 generates a repositioning signal based on the determined amount to shift the dove prism 452.

At 928, the controller 205, 220 shifts the dove prism 452 in the X-axis direction and Y-axis direction by half the distance that the target 416' has moved in each coordinate direction relative to the beam output 466 to reposition the beam 420.

As described above, piezoelectric transducers are actuators that can be configured as the drive mechanism to correct for vibration disturbances. Piezoelectric actuators provide sub-micron displacements at high speed; limitations are imposed by the frequency and noise capabilities of the voltage signals as opposed to the mechanism of the device. An alternative drive mechanism for stabilizing the beam output of a cryogenic lens is to mount it on bearing-based nanopositioners. However, not only must the bearing-based nanopositioners support heavy loads of the cryogenic lens assemblies, which can be on the order of 500 g, but the stability and rigidity of the assembly will be significantly less than what is provided by the piezoelectric actuators, which are solid ceramic bodies. In the application of the piezoelectric actuators, the stiffness limitations will be at the boundaries between the lens, mounting structures, piezos (i.e., piezoelectric actuators/transducers), and dove prism as opposed to the piezos themselves. Additionally, the piezoelectric actuators can operate in cryogenic environments and have compact footprints. To achieve a larger operating range of the piezoelectric actuator in any one direction, multiple devices can be stacked in series, making the solution versatile for many operating conditions.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A system for piezoelectric-based beam stabilization, the system including:
    a laser beam source configured to produce a laser beam;
    a target;
    a lens assembly including a lens objective configured to produce an output beam from the laser beam and at least one optical element movably coupled to the lens assembly and configured to direct the laser beam to the target; and
    one or more piezoelectric transducers coupled to the at least one optical element and configured to dynamically reposition the at least one optical element in response to relative motion between the target and the lens assembly.

2. The system of claim 1, wherein the at least one optical element includes a dove prism.

3. The system of claim 1, wherein the at least one optical element includes a first optical element, and further comprising a second optical element fixedly coupled to the lens assembly, the second optical element configured to direct the output beam onto the first optical element.

4. The system of claim 1, further comprising one or more non-contact sensors coupled to one of the target and the lens assembly and a sensor target coupled to the other of the target and the lens assembly.

5. The system of claim 4, wherein the one or more non-contact sensors include at least one of interferometer sensors, capacitive sensors, or a combination thereof.

6. The system of claim 4, further comprising a controller configured to:
    receive information indicative of a position of the position of the target or the lens assembly from the one or more non-contact sensors;
    determine a displacement of one of the target and the lens assembly relative to the other of the target and the lens assembly; and
    command the one or more piezoelectric transducers to reposition the at least one optical element to reposition the laser beam relative to the target.

7. The system of claim 1, wherein the target and the lens assembly are fixedly coupled to a common surface, and wherein the relative motion is caused by vibrations of the common surface or thermal contractions in one or more of the target and the lens assembly.

8. The system of claim 1, wherein the lens assembly is fixedly coupled to a first surface and the target is fixedly coupled to a second surface, and wherein the relative motion is caused by relative vibrations between the first surface and the second surface.

9. The system of claim 8, wherein the first surface and the second surface are positioned inside a cryogenic environment.

10. The system of claim 1, wherein the system is a quantum information processing (QIP) system including a cryostat configured to form a cryogenic environment.

11. The system of claim 10, wherein the target includes an ion trap.

12. The system of claim 10, wherein the laser beam source is positioned outside of the cryogenic environment.

13. A computer implemented method for performing piezoelectric-based beam stabilization for a cryogenic environment, the computer-implemented method comprising:
    receiving, by a computing system including a processor and a memory, information indicative of a relative position of a target and a cryogenic lens assembly positioned inside the cryogenic environment;

determining, by the computing system, an amount of displacement between the target and the cryogenic lens assembly; and generating, by the computing system, a repositioning command configured to actuate one or more piezoelectric elements coupled to a movable optical element of the cryogenic lens assembly to reposition the movable optical element to direct an output beam produced by an objective lens of the cryogenic lens assembly onto the target.

14. The method of claim 13, wherein performing the piezoelectric-based beam stabilization for the cryogenic environment includes performing as part of a quantum information processing (QIP) system.

15. The method of claim 13, wherein the information indicative of the relative position of the target and the cryogenic lens assembly is determined by one or more non-contact sensors coupled to one of the target and the cryogenic lens assembly and a sensor target coupled to the other of the target and the lens assembly.

16. The method of claim 15, wherein the one or more non-contact sensors include at least one of interferometer sensors, capacitive sensors, or a combination thereof.

17. The method of claim 13, wherein the target includes an ion trap.

18. The method of claim 13, wherein the method occurs in real-time or in substantially real-time.

19. The method of claim 13, wherein the target and the cryogenic lens assembly are fixedly coupled to a common surface, and wherein relative motion between the target is caused by vibrations of the cryostat or thermal contractions in one or more of the target and the lens assembly.

20. The method of claim 13, wherein the cryogenic lens assembly is fixedly coupled to a first surface and the target is fixedly coupled to a second surface, and wherein relative motion is caused by relative vibrations between the first surface and the second surface.

* * * * *